United States Patent [19]

Cook

[11] Patent Number: 5,384,889
[45] Date of Patent: Jan. 24, 1995

[54] HEATER FOR HEATING A PLASTIC SLEEVE ABOUT A PORTION OF A WIRE HARNESS

[75] Inventor: Michael R. Cook, Tockenham, England

[73] Assignee: Raychem Limited, United Kingdom

[21] Appl. No.: 119,056

[22] PCT Filed: Apr. 9, 1992

[86] PCT No.: PCT/GB92/00638

§ 371 Date: Sep. 15, 1993

§ 102(e) Date: Sep. 15, 1993

[87] PCT Pub. No.: WO92/18321

PCT Pub. Date: Oct. 29, 1992

[30] Foreign Application Priority Data

Apr. 9, 1991 [GB] United Kingdom ................. 9107468

[51] Int. Cl.⁶ ........................ B29C 63/42; H01R 4/72; H05B 3/00
[52] U.S. Cl. ..................................... 392/416; 392/418; 219/524; 219/521; 219/385; 432/225; 269/87.2
[58] Field of Search ................. 392/416, 418; 219/243, 219/221, 524, 525, 403, 404, 521, 385; 432/225, 121, 34; 156/583.9, 583.8, 583.7, 583.6, 381; 264/1.5; 425/318; 174/DIG. 8; 269/87.2, 86

[56] References Cited

U.S. PATENT DOCUMENTS

| | | | |
|---|---|---|---|
| Re. 24,296 | 3/1957 | Stewart | 219/403 |
| 3,062,944 | 12/1962 | Grandel | 219/227 |
| 3,353,005 | 11/1967 | Sisson et al. | 219/411 |
| 3,396,455 | 8/1968 | Sherlock | 392/418 |
| 4,749,843 | 6/1988 | Abramson | 432/225 |
| 4,764,662 | 8/1988 | Andersen et al. | 219/391 |

FOREIGN PATENT DOCUMENTS

| | | |
|---|---|---|
| 121646 | 10/1984 | European Pat. Off. . |
| 8525384 | 1/1987 | Germany . |
| 58-171011 | 10/1983 | Japan . |
| 63-092435 | 4/1988 | Japan . |
| 1199264 | 7/1970 | United Kingdom . |
| 1567636 | 5/1980 | United Kingdom . |
| 88/02837 | 4/1988 | WIPO . |

*Primary Examiner*—Bruce A. Reynolds
*Assistant Examiner*—John A. Jeffery
*Attorney, Agent, or Firm*—Sheri M. Novack; Herbert G. Burkard

[57] ABSTRACT

A heating device for recovering a heat-recoverable plastics sleeve about a portion of a wire harness comprises a housing having a heating location when the portion of the harness and heat-recoverable sleeve are introduced, and a heating unit that is movable between a rearward position in which it surrounds the heating location. The heating unit comprises a pair of heating jaws (5,5') that open as they move toward the heating location and then close as they arrive at it so that the portion of the harness to be heated is completely enclosed within the heating unit. The jaws open again when they recede from the heating location to allow the harness to be removed.

6 Claims, 4 Drawing Sheets

HEATER FOR HEATING A PLASTIC SLEEVE ABOUT A PORTION OF A WIRE HARNESS

This invention relates to heating devices, and in particular to devices for recovering heat-recoverable plastics sleeves about a portion of an electrical wire harness.

In the manufacture of automotive harnesses it is often necessary to form a splice between a number of wires. The splice may be formed by stripping insulation from the ends of the wires and then joining them by ultrasonic welding apparatus. After the weld has been made it can be insulated and sealed from the environment by recovering a length of heat-recoverable tubing over the weld area and the adjacent insulated regions of the wiring. In order to recover the sleeve, a number of heater devices have been proposed that are intended to sit on the ultrasonic welding apparatus in the region of the welding head so that the operator can feed the harness splice with its associated recoverable sleeve into the heater.

For example, one form of heater is described in U.S. Pat. No. 4,764,662 in which the splice and sleeve are moved above the heater and are lowered vertically into it. This device has the disadvantage that large amounts of energy may be lost as the splice is drawn into the heater chamber due to the vertical action, which leads to inconsistent installations. In addition this device is relatively poor from an ergonomic point of view since it requires considerable stretching on the part of the operators when loading and initiating the cycle.

Another form of heater is described in U.S. Pat. No. 4,749,843. This heater has a horizontal feed in which the wire harness is offered to the device whereupon it is gripped and drawn into a heating chamber and, after the heating step, is returned to its original position and the grippers open allowing ejection of the splice by gravity. Although this heater is ergonomically much better than the vertical heater described above, it suffers from the fact that there is a considerable degree of heat loss from the heating chamber inlet cavity which can cause the device as a whole to become very hot and causes the device to require relatively long heating cycles in order to ensure uniform recovery of the sleeve. In addition, movement of the splice and sleeve to the heating chamber by the device before recovery can cause the sleeve to move with respect to the splice and form an unacceptable insulation.

According to the present invention, there is provided a heating device for recovering a heat-recoverable plastics sleeve about a portion of a wire harness, which comprises a housing having a heating location where the portion of the harness and heat-recoverable sleeve positioned thereon are introduced, a heating unit that is movable between a rearward position in which it is separated from the heating location, and a forward position in which it surrounds the heating location, the heating unit comprising a pair of heating jaws that are caused to open as the heating unit moves toward the heating location and then to close as the heating unit arrives at the heating location, so that the portion of the harness and sleeve are substantially completely enclosed within the heating unit, the jaws being caused to open as the heating unit recedes from the heating location in order to allow the portion of the wire harness and sleeve to be removed.

The heating device according to the present invention has the advantage that it is ergonomically relatively easy to use since the operator need not move the splice very far before it is accepted by the device. In addition, there is very little danger of the sleeve being dislodged from the splice region before recovery thereof since the splice and sleeve do not move once they have been accepted by the device. Furthermore, the device is relatively efficient with regard to heater power and does not lead to overheating of the device housing because the jaws of the heating unit are closed most of the time and open horizontally, thereby reducing heat escape.

The device will normally include a holding arrangement for preventing movement of the splice while being heated. Such an arrangement can conveniently comprise a pair of pressure places located on each side of the heating unit, one pressure plate of each pair being biased toward the other to grip the harness between them. It may be appropriate for the arrangement to include a latch (preferably one on each side of the heating unit) that prevents removal of the wire harness from the heating location when the heating unit surrounds the portion of the harness, but is moved to a position that allows removal of the wire harness when the heating unit recedes from the heating location. In addition or alternatively it may be desirable for the arrangement to include an ejection member that forces the wire harness out of the heating location when the heating unit recedes from the heating location. Such an arrangement will ensure that the completed splice is automatically ejected, and the device can easily be arranged so that the completed splice simply drops onto the working surface in front of the device.

The heating unit is preferably constructed in the form of a pair of jaws of substantially the same size as one another so that each jaw provides half the heating unit. The heating unit may include a heating assembly comprising an arcuate array of heating lamps that defines one half of a heating chamber when the jaws are brought together, the heating lamps being surrounded by a quality of thermal insulation. Thus the jaws will open out as the heating element approaches the heating location and then will close in order to surround the splice and sleeve relatively uniformly by the heating lamps and thereby enable the sleeve to be recovered evenly around its circumference.

A device in accordance with the invention will now be described by way of example with reference to the accompanying drawings in which.

Figure 1:
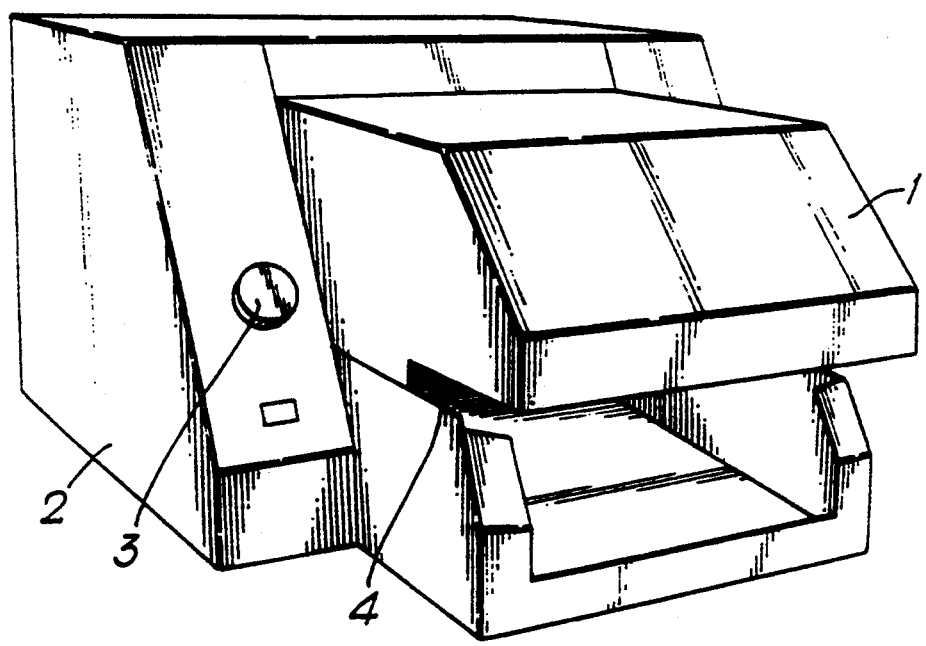
FIG. 1 is a perspective view of the housing of the heating device.

Referring to the accompanying drawings the housing of a heating device is shown in FIG. 1. The housing has a central portion including a hood 1 that encloses the heating unit and drive mechanism of the device, and a side portion 2 on either side upon which a start button 3 is located together with other features (not shown) such as the heater and timer settings. Underneath the hood 1 on either side of the central portion of the gap 4 that is in line with the heating location.

Figure 2:
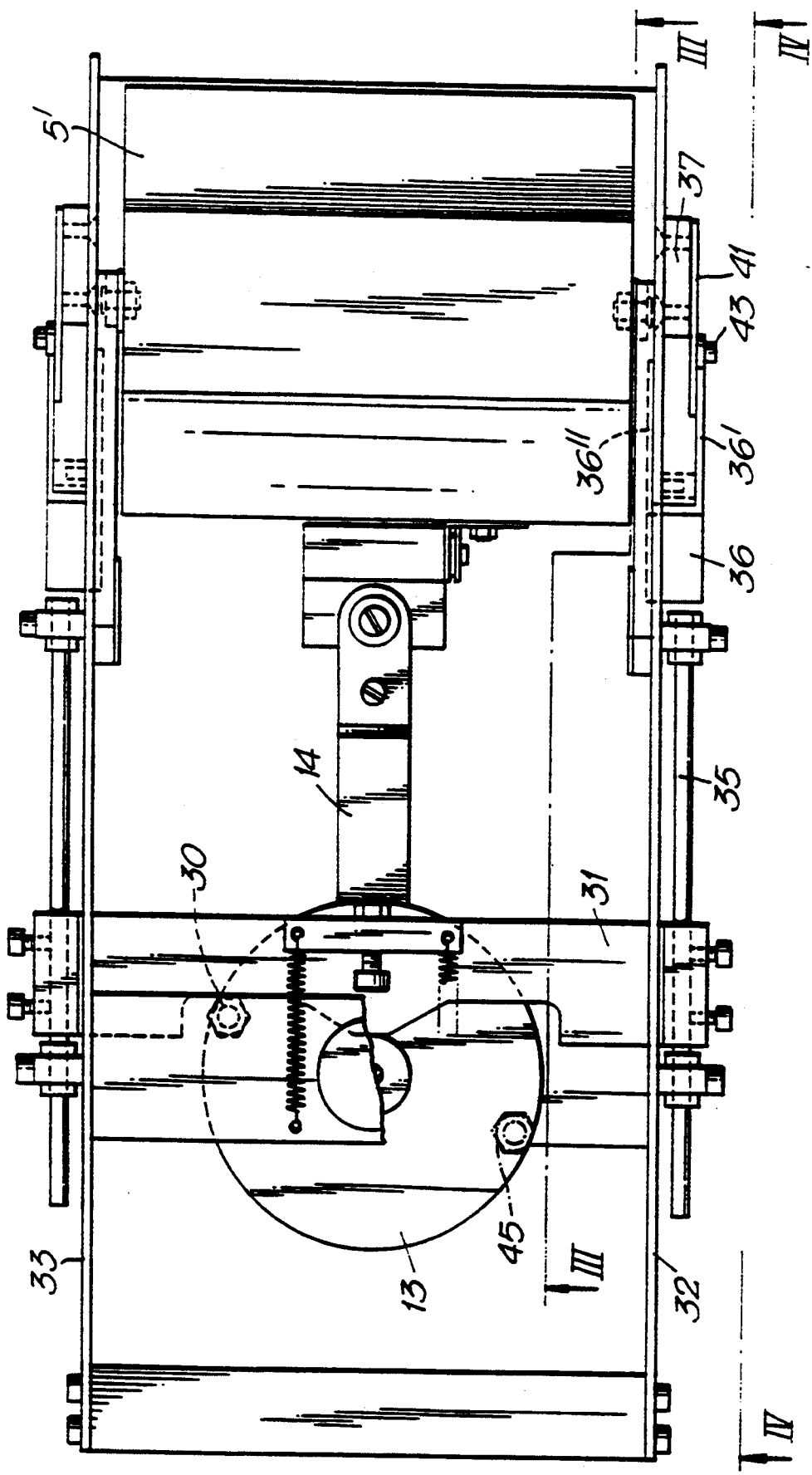
FIG. 2 is a top plan flew showing the inside of the device.
Figure 3:
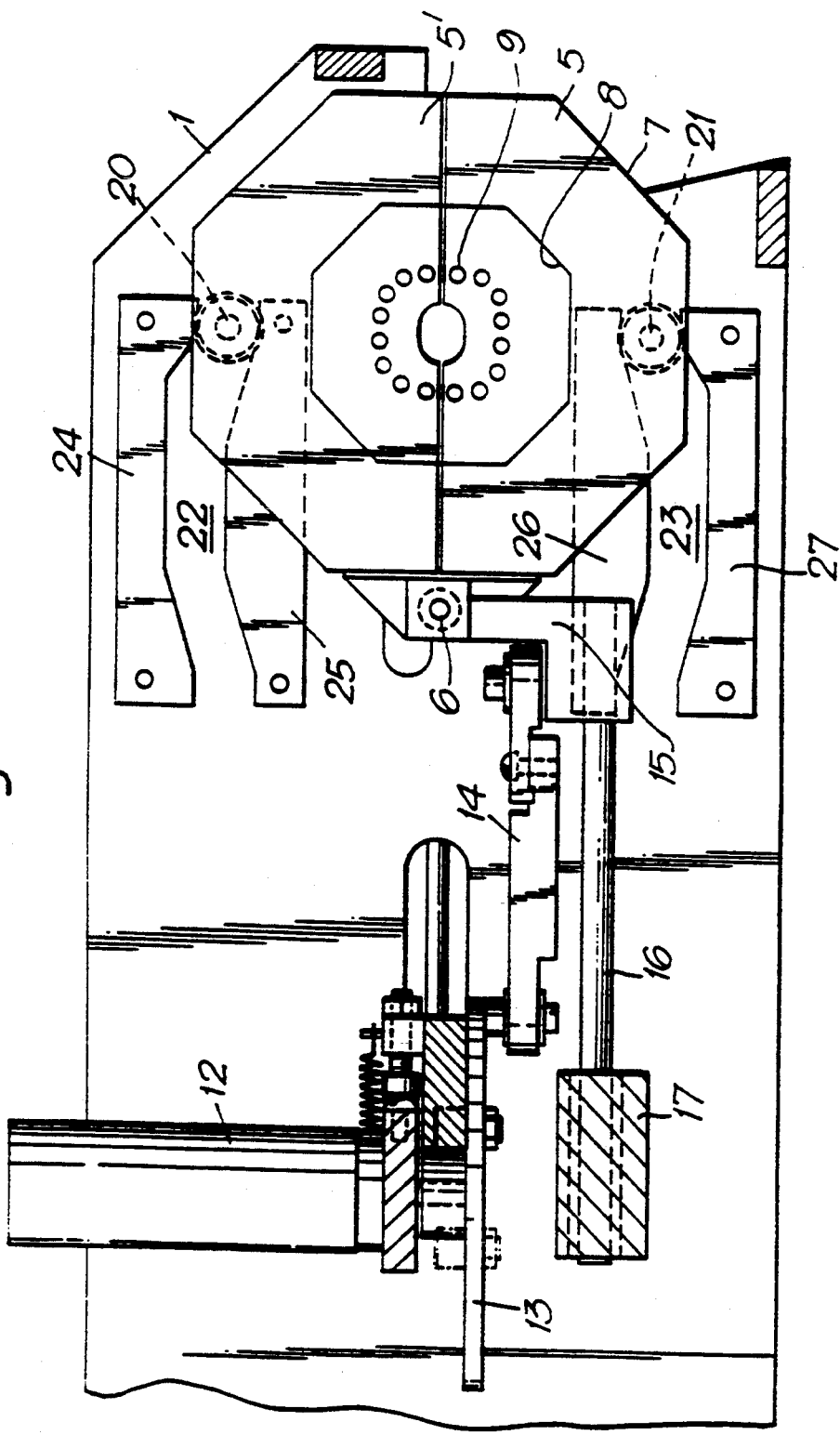
FIG. 3 is a side sectional elevation along the line III—III of FIG. 2.
Figure 4:
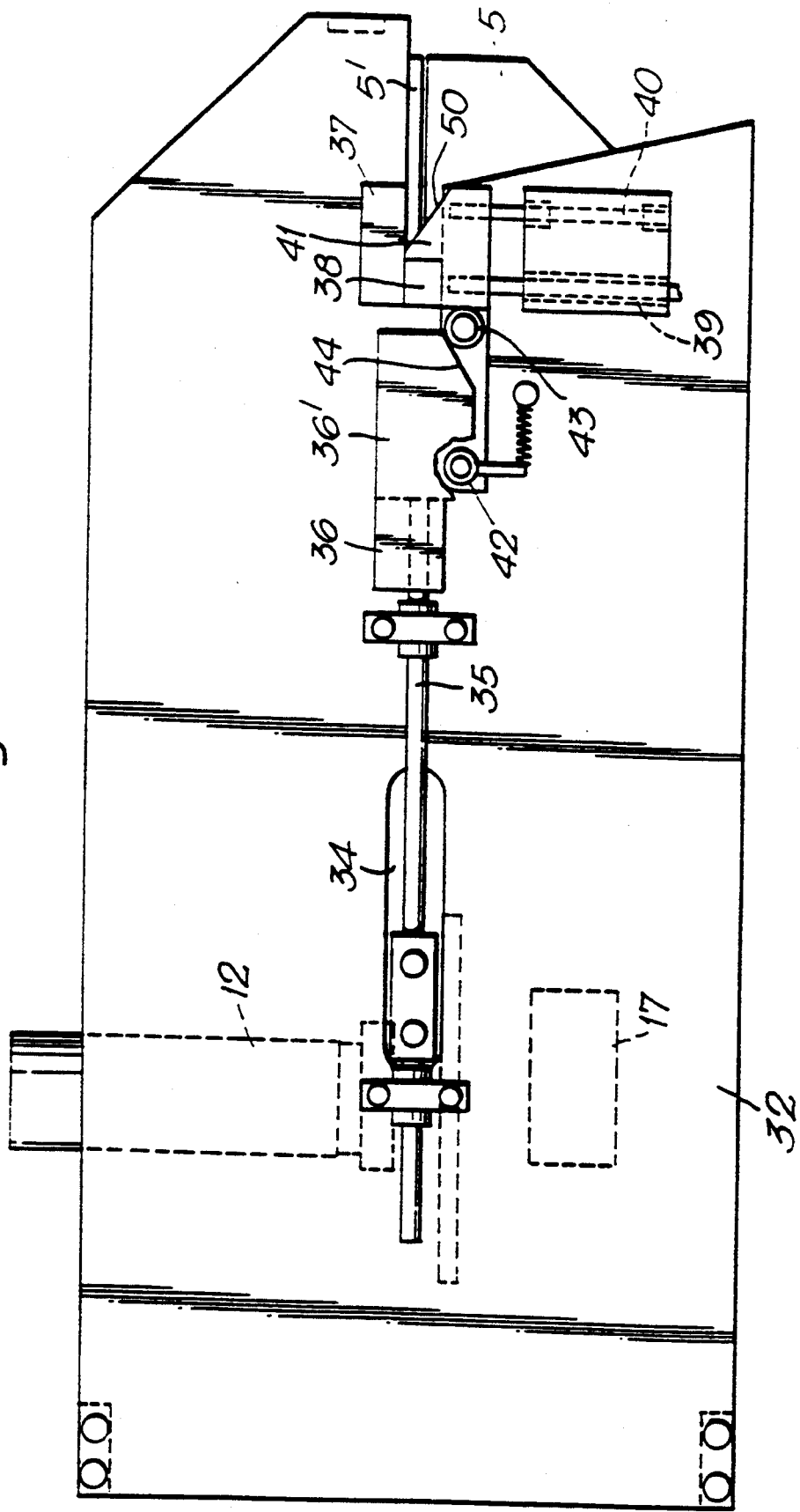
FIG. 4 is a side view taken along the lines IV—IV of FIG. 2.

Referring to FIGS. 2 to 4, the heating device has a heating unit that comprises a pair of jaws 5 and 5' that are connected together at a pivot 6. Each heater jaw comprises an outer housing 7 and an inner heater unit 8 that fits inside the outer housing. Each inner heater unit 8 comprises an arcuate array of eight cylindrical quartz infrared heating lamps 9 located within an arcuate block 10 of silica aerogel thermal insulation. Further silica aerogel thermal insulation is provided in the outer jaw housings 7.

A vertically mounted d.c. electric motor 12 is connected to a disk-shaped crank 13 to which one end of rod 14 is connected. The other end of rod 14 is connected to the pivot 6 of the heater jaws via block 15. Block 15 is also securely attached to shaft 16 that is able to slide in bearing 17 so that pivot 6 is always maintained at a constant height and the orientation of the heater jaws is controlled.

Each heater jaw is provided with a roller bearing 20 or 21 which is located within a channel 22 or 23 respectively formed between appropriately shaped sheets 24 and 25 or 26 and 27 in order to support each jaw.

The crank 13 is also provided with a cam follower 30. A transverse plate 31 extends from one side wall 32 to the other side wall 33 and through a slot 34 in each side wall. Each end of the transverse plate 31 is attached to a forwardly extending shaft 35 forward end of which is attached to a harness ejecting member 36 which forks into a pair of identical arms 36' and 36".

A harness retention arrangement comprises a fixed top pressure plate 37 and a bottom pressure plate 38 that is constrained to move vertically by means of guide 39 and is biased toward the top pressure plate 37 by means of a spring 40. A latch 41 is also provided which is biased upwardly by means of a spring (not shown) and is pivoted by pivot 42. The latch 41 is provided with a roller bearing 43 that engages a lower chamfered edge 44 of the ejection member arms 36' to cause the forward end of the latch to be pushed downwardly as the ejection member moves forwards. The forwardmost edge of both the bottom pressure plate 38 and the latch 41 are provided with a chamfered edge 50 (so that their forwardmost edges are coincident as when viewed from the side).

In operation the operator places the heat-recoverable plastics sleeve over the weld in the harness splice and then places the splice in the gap 4 of the housing. As the splice is placed in this position the forward end of latch 41 and the lower pressure plate 38 are both pushed downwards to accommodate it by the splice acting on their upper chamfered surfaces 50. As soon as the splice is in position the latch 41 moves up under the action of spring 40 to retain the splice in position.

When the device is actuated by means of start button 3, the motor 12 rotates crank 13 by 180° thereby moving rod 14 and the jaws 5 and 5' to their forwardmost position as shown in the drawings. As the jaws 5 and 5' move forward the "mouth" formed between them is caused to open and then to close by the path that the channels 22 and 23 force the roller bearings 20 and 21 to take so that the splice is enclosed within a closed heating chamber 44 formed within the jaws 5 and 5'. While the splice is enclosed in the heating chamber 44, the plastics sleeve is shrunk about the splice and any sealant, e.g. a hot-melt adhesive, the the sleeve is caused to flow and seal the splice.

After a period of time that may be preset by the operator, the motor rotates the crank 13 again by 180° to its original position whereupon the cam follower 30 is positioned at location 45 over the second proximity switch (not shown) as the crank rotates further. During this half rotation rod 14 and the jaws 5 and 5' are moved to their rearmost position. As with the forward motion of the jaws, the jaws 5 and 5' are caused to open and then to close again as the roller bearings follow the paths of channels 22 and 23, thereby releasing the splice from the chamber 44. At the same time the transverse plate 31 is pushed forward by the cam follower 30 until the cam follower is at its forwardmost position, and then moves rearwardly under the action of a spring (not shown). The forward motion of the transverse plate 31 causes the shaft and harness ejecting member 36 located on each side of the housing to move forward. As the harness ejecting member 36 moves forward its chamfered edge 44 bears on the roller bearing 43 of the latch 41 and causes the latch 41 to move downwards to allow the splice to be ejected. Further forward movement of the ejecting member causes its front edge to sweep past the pressure plates 37 and 38, thereby ejecting the splice from the gap 4 and allowing it to drop onto the worksurface.

I claim:

1. A heating device for recovering a heat-recoverable plastics sleeve about a portion of a wire harness, which comprises a housing having a heating location where a portion of a harness and heat-recoverable sleeve positioned thereon are introduced, a heating unit that is movable between a rearward position in which it is separated from the heating location, and a forward position in which it surrounds the heating location, the heating unit comprising a pair of heating jaws that are caused to open as the heating unit moves toward the heating location and then to close as the heating unit arrives at the heating location, so that a portion of a harness and sleeve are substantially completely enclosed within the heating unit, the jaws being caused to open as the heating unit recedes from the heating location in order to allow a portion of a wire harness and sleeve to be removed.

2. A device as claimed in claim 1 which includes an arrangement for holding a wire harness in the heating location which comprises a pair of pressure plates located on each side of the heating unit, one pressure plate of each pair being biased toward the other in order to grip a harness between them.

3. A device as claimed in claim 2, wherein each arrangement includes a latch adapted to prevent removal of a wire hardness from the heating location when the heating unit surrounds a portion of a harness, but is adapted to move to a position that allows removal of a wire harness when the heating unit recedes from the heating location.

4. A device as claimed in claim 2, wherein each arrangement includes an ejection member adapted to force a wire harness out of the heating location when the heating unit recedes from the heating location.

5. A device as claimed in claim 1, wherein each jaw of the heating unit has a bearing on each side thereof that cooperates with a guide surface on the housing to cause the jaws to open and close as the heating unit is moved between said rearward and forward positions.

6. A device as claimed in claims 1, wherein each jaw of the heating unit includes a heating assembly comprising an arcuate array of heating lamps that defines one half of a heating chamber when the jaws are brought together, the heating lamps being surrounded by a quantity of thermal insulation.

* * * * *

UNITED STATES PATENT AND TRADEMARK OFFICE
CERTIFICATE OF CORRECTION

PATENT NO. : 5,384,889
DATED : January 24, 1995
INVENTOR(S) : Micheal R. Cook

It is certified that error appears in the above-indentified patent and that said Letters Patent is hereby corrected as shown below:

Column 2, line 15, replace "places" by --plates--.
Column 4, line 62, replace "claims by --claim--.

Signed and Sealed this

Ninth Day of May, 1995

BRUCE LEHMAN

*Attest:*

*Attesting Officer*     *Commissioner of Patents and Trademarks*